United States Patent
Cornell et al.

(10) Patent No.: US 10,970,507 B1
(45) Date of Patent: Apr. 6, 2021

(54) DISABLE SCANNER ILLUMINATION AND AIMER BASED ON PRE-DEFINED SCANNER POSITION

(71) Applicant: ZEBRA TECHNOLOGIES CORPORATION, Lincolnshire, IL (US)

(72) Inventors: Andrew Cornell, East Northport, NY (US); Andrew M. Doorty, Northport, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 16/706,392

(22) Filed: Dec. 6, 2019

(51) Int. Cl.
*G06K 5/04* (2006.01)
*G06K 7/14* (2006.01)

(52) U.S. Cl.
CPC .......... *G06K 7/1443* (2013.01); *G06K 7/1456* (2013.01)

(58) Field of Classification Search
CPC ............................ G06K 7/1443; G06K 7/1456
USPC .............. 235/462.08, 462.09, 462.2, 462.42, 235/462.23, 440, 470, 454
See application file for complete search history.

(56) References Cited

U.S. PATENT DOCUMENTS

| | | | | |
|---|---|---|---|---|
| 2007/0295813 | A1* | 12/2007 | Kotlarsky | G06K 7/10851 235/454 |
| 2013/0181051 | A1* | 7/2013 | Olmstead | G06K 7/1096 235/440 |
| 2014/0014727 | A1* | 1/2014 | Choi | G06K 7/10386 235/470 |

* cited by examiner

*Primary Examiner* — Karl D Frech
(74) *Attorney, Agent, or Firm* — Yuri Astvatsaturov (57) ABSTRACT

Methods and systems for disabling barcode reader illumination and aiming operation based on barcode reader position are disclosed herein. An example method includes a barcode reader determining its angular position, for example, from an accelerometer mounted in the barcode reader. That angular position is compared against a reference angular position and a determination is made whether barcode reader is in a disable angular region. When in the disable angular region, the barcode reader automatically disables illumination and/or aiming operation until the angular position enters an enable angular region. That enable angular region may be different than the disable angular region, and both may be adjustable.

21 Claims, 6 Drawing Sheets

DISABLE SCANNER ILLUMINATION AND AIMER BASED ON PRE-DEFINED SCANNER POSITION

BACKGROUND

Barcodes are commonly used to encode data associated with a variety of items that the barcodes are often printed on or attached thereto. Historically, laser-based barcode readers were employed to read barcode data and thereafter decode the payload. With the proliferation of imaging sensors, imager-based barcode readers have become mainstream. These barcode readers typically capture image data associated with the imager's field of view (FOV) and identify and decode barcodes found within the image data. Regardless of barcode type, many barcode readers emit light. Some emit an aiming pattern that gives a visual indication to a user where the barcode scanning is to take place. Some emit an actual illumination, for example, to illuminate an area of a FOV to be capture by an imager.

Operators of barcode scanners, whether consumers or personnel, occasionally question the safety of having their eyes exposed to the aiming patterns and illumination beams generated by these barcode readers. To reduce the chances that a user's eyes are exposed to either aiming patterns or illumination light, there is a desire to safely disable operation of either when a barcode reader is in an orientation at which a user's eyes may be exposed.

SUMMARY

In an embodiment, the present invention is a method for controlling illumination of barcode reader, the method comprises: receiving, at the barcode reader, an angular position of the barcode reader, wherein the angular position is relative to a reference angular position of the barcode reader; determining when the angular position of the barcode reader is in a disable angular region; and in response to the angular position of the barcode reading being in the disable angular region, disabling at least one of an illumination system in the barcode reader to prevent the barcode reader from illuminating a field of view or an aiming system in the barcode reader to disable the barcode reader from transmitting an aiming visual indicator.

In a variation of this embodiment, the method includes determining when the angular position of the barcode reader is in an enable angular region; and in response to the angular position of the barcode reading being in the enable angular region, enabling at least one of the illumination system in the barcode reader to illuminate a field of view or the aiming system in the barcode reader to transmit the aiming visual indicator.

In a variation of this embodiment, the method includes determining when the angular position of the barcode reader is greater than a disable angle; and determining when the angular position of the barcode reader is less than an enable angle.

In a variation of this embodiment, the disable angle and the enable angle are the same. In another variation, the disable angle and the enable angle are different angles.

In another embodiment, the present invention is a barcode reader comprising: an accelerometer configured to determine an angular position of the barcode reader relative to a reference angular position of the barcode reader; a processor configured to: receive the angular position of the barcode reader; determine when the angular position of the barcode reader is in a disable angular region; and in response to the angular position of the barcode reading being in the disable angular region, disable at least one of an illumination system in the barcode reader to prevent the barcode reader from illuminating a field of view or an aiming system in the barcode reader to disable the barcode reader from transmitting an aiming visual indicator.

In a variation of this embodiment, the processor is configured to: determine when the angular position of the barcode reader is in an enable angular region; and in response to the angular position of the barcode reading being in the enable angular region, enable at least one of the illumination system in the barcode reader to illuminate a field of view or the aiming system in the barcode reader to transmit the aiming visual indicator.

In a variation of this embodiment, the processor is configured to: determine when the angular position of the barcode reader is in the disable angular region by determining when the angular position of the barcode reader is greater than a disable angle; and wherein the processor is configured to determine when the angular position of the barcode reader is in the enable angular region by determining when the angular position of the barcode reader is less than an enable angle.

In a variation of this embodiment, the barcode reader is a wearable barcode reader.

In a variation of this embodiment, the barcode reader is a handheld barcode reader.

In a variation of this embodiment, the barcode reader is a base-mounted barcode reader.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present techniques provide systems and methods for controlling illumination of barcode reader. In some examples, the techniques include a method for controlling illumination of a barcode reader, where that method includes receiving an angular position of the barcode reader, where the angular position is relative to a reference angular position of the barcode reader. In some examples, the method determines when the angular position of the barcode reader is in a disable angular region, and, in response to the angular position of the barcode reading being in the disable angular region, the method disables either an illumination system in the barcode reader to prevent the barcode reader from illuminating a field of view or an aiming system in the barcode reader to disable the barcode reader from transmitting an aiming visual indicator. Example systems herein perform similar functions. By controllably disabling an illumination assembly and/or aimer assembly of a barcode reader based on the angular position of the barcode reader, user operation is enhanced, as the user is less likely to have high intensity laser light or other illumination light impinge upon their eyes.

Figure 1:
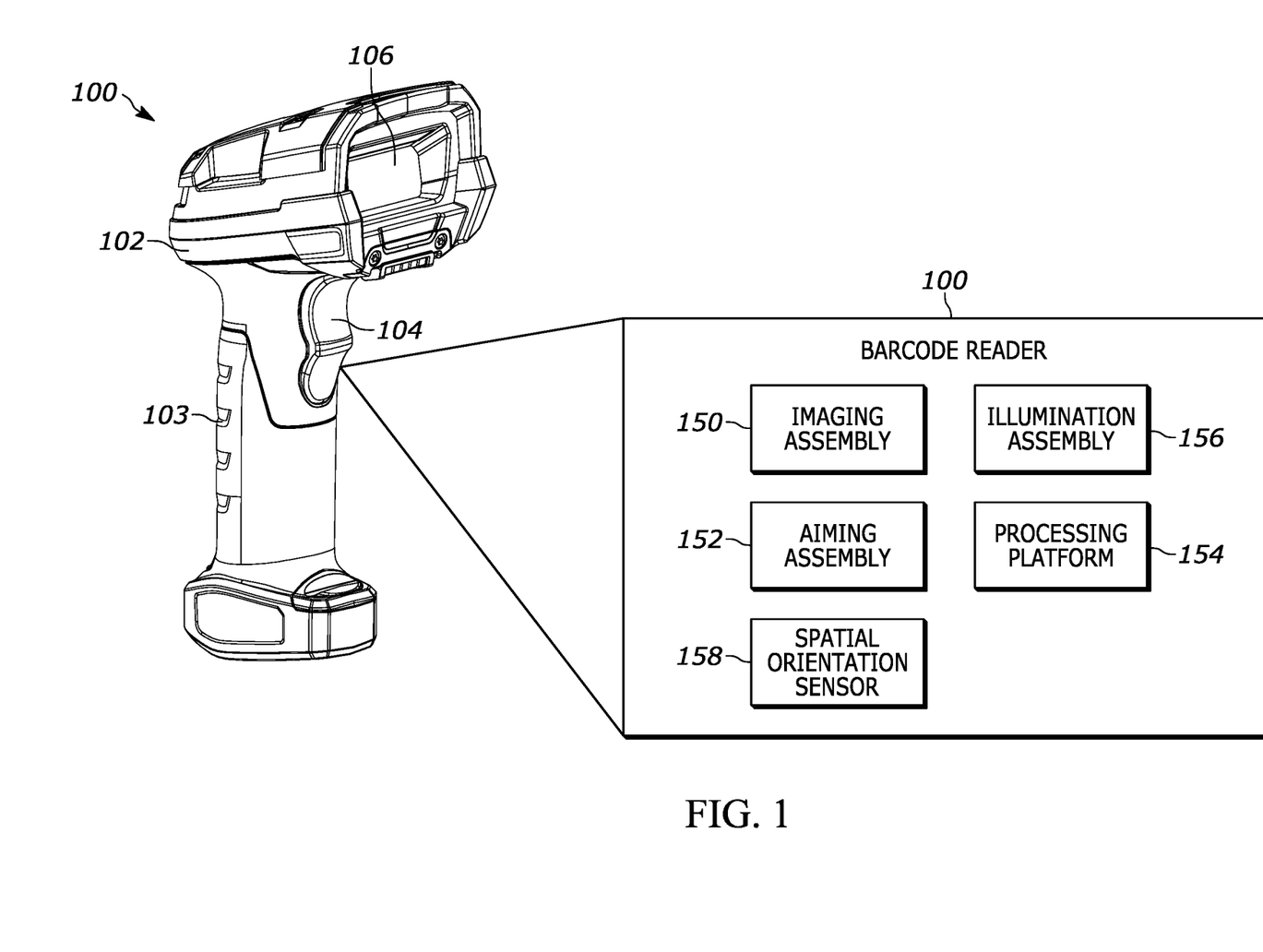
FIG. 1 illustrates a barcode reader for implementing example methods and/or operations described herein.

FIG. 1 is an illustration of an example barcode reader 100 capable of implementing operations of the example methods described herein, as may be represented by the flowcharts of the drawings that accompany this description. In the illustrated example, the barcode reader 100 includes a housing 102 with a handle 103 having a trigger 104 on an interior side of the handle.

In the illustrated example, the barcode reader 100 enters a read operation state by the pulling the trigger 104 to scan barcodes. In some examples, the barcode reader 100 is maintained in the read operation state as long as the trigger 104 is depressed, while in the other examples the read operation state is entered with a first trigger pull and exited with a subsequent trigger pull. Thus, in some examples, the read operation may involve a single event trigger. In yet other examples, the read operation may be initiated by two or more events. The barcode reader 100 may be configured to perform a read operation, by determining if a barcode is impinged by an aiming pattern.

The housing 102 further includes a scanning window 106 through which the barcode reader 100 illuminates a target such a product or other target having barcode or any other readable symbology. As used herein, reference to barcode includes any indicia that contains decodable information and that may be presented on or within a target, including by not limited to, a one dimension barcode, a two dimension barcode, a three dimension barcode, a four dimension barcode, a QR code, a direct part marking (DPM), etc.

In the illustrated example, the barcode reader 100 includes an imaging assembly 150 configured to capture an image of a target, in particular a barcode on the target. The barcode reader 100 further includes an aiming assembly 152 configured to generate an aiming pattern, e.g., dot, crosshairs, line, rectangle, circle, etc., that impinges on the target. The barcode reader 100 further includes a processing platform 154 configured to interface with the imaging assembly 150, the aiming assembly 152, and other components of the barcode reader 100 to implement operations of the example methods described herein, including those as may be represented by the flowcharts of the drawings such as in FIG. 4. The barcode reader 100 further includes an illumination assembly 156 configured to illuminate a target over a view of field of the barcode reader 100. The illumination assembly 156 may generate a monochromatic illumination over the field of view, while in other examples, the illumination assembly 156 generates a poly-chromatic illumination, such a white light illumination, over the field of view. In some examples, the field of view is defined by the scanning window 106. In some examples, the field of view is defined by one or more of the imaging assembly 150 and the illumination assembly 156, either alone, or in combination with the scanning window 106 and/or other structures within the housing 102.

To determine angular position of the barcode reader 100 and to determine whether the barcode reader 100 is oriented in a disable angular region, the barcode reader 100 includes a spatial orientation sensor 158, which may be a 1D, 2D, or 3D orientation sensor. In some examples, the sensor 158 is an accelerometer. In some examples, the spatial orientation sensor 158 is a separate component amounted within the housing 102. In some examples, the spatial orientation sensor 158 is formed as a part of one of the other systems shown, such as part of the processing platform 154. For example, an accelerometer may be mounted to a circuit board or other mounting of a logic circuit implemented as the processing platform 154. Indeed, any of the systems shown 150, 152, 154, 156, and 158 may be configured as part of the same logic circuit structure (e.g., printed circuit board) mountable within the housing 102. In other examples, the sensor 158 may be an accelerator separately mounted in the handle 103 and coupled to the processing platform 154 through an I/O interface connector.

In operation, spatial orientation sensor 158 is configured to determine an angular position of the barcode and generate spatial orientation data that includes angular position information. In some examples, the spatial orientation data is 1D data, such as angular data measured from reference plane and along one spherical coordinate axis ($\theta$, $\phi$, or P). In some examples, the spatial orientation data is 2D data having coordinates over two spherical coordinate axes. In yet other examples, the spatial orientation data is 3D data having coordinates over three spherical coordinate axes. While in examples herein the spatial orientation data is described as angular data, the data may take any suitable form relative to a reference position, reference plane, reference axis, etc.

Figure 2A:
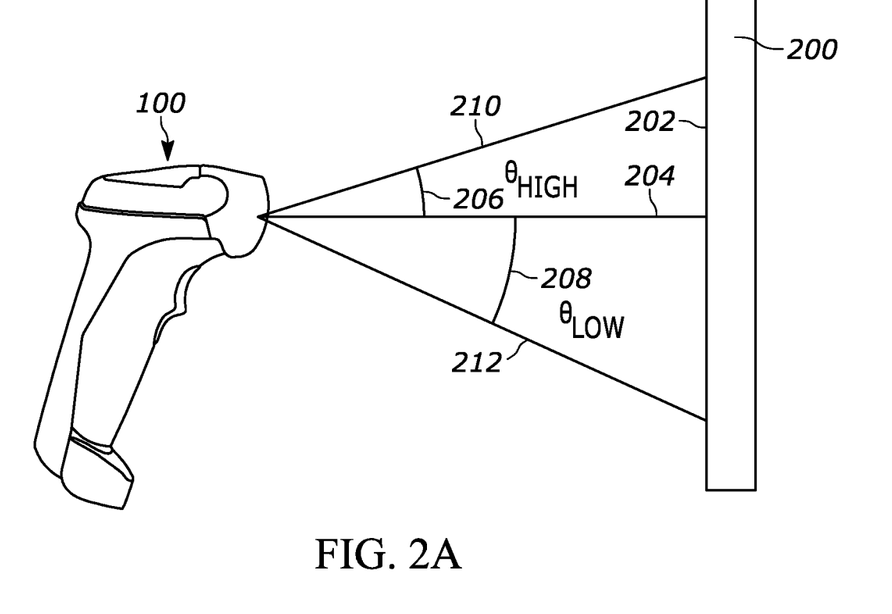
FIGS. 2A and 2B illustrate various example scanning positions, including an enabled scanning region and a disabled scanning region, respectively, of the barcode reader of FIG. 1 demonstrating operations of methods and/or operations described herein.

FIG. 2A illustrates the barcode reader 100 in a common position for scanning a target 200, which may be a product or other object having a barcode. In the illustrated position, the barcode reader 100 is positioned such that the distance between the scanning window 106 and a scan surface 202 of the target 200 is the shortest possible distance. That is, the barcode reader 100 is axially aligned with a first angular position 204, which is also a reference angular position in the illustrated example. In particular, for this example, a reference angular position corresponds to a horizontal plane, and is defined as $\theta=0$. In some examples, the first angular position 204 coincides with a spatial orientation of $\theta=0$, as measured by the spatial orientation sensor 158. In various embodiments, the spatial orientation sensor 158 is configured to define a particular angular position relative a universal horizontal position, as the reference angular position for a barcode reader. In the example of FIG. 2A, that the reference angular position is the 0 degrees relative to the universal horizontal position.

The barcode reader 100 can safely scan the target at this first angular position 204. Indeed, the barcode reader 100 implementing example methods and/or operations described herein is configured to safely scan the target over a range of angles above and below the angular position 204. That is, as the barcode reader 100 is tilted upward or tilted downward from the first angular position 204, the barcode reader 100 can maintain scanning operation, including, in particular maintaining the illumination from the illumination assembly 156 and the aiming pattern from the aiming assembly 152.

In FIG. 2A, the range of allowed scanning angular positions is defined by an upper threshold angle 206 and a by a lower threshold angle 208. That is, the barcode reader 100 can tilt upwards from the first angular position 204 to an uppermost angular position 210, corresponding to an angle $\theta_{HIGH}$ (206) and maintain operation of the illumination assembly 156 and the aiming assembly 152. Correspondingly, the barcode reader 100 can tilt downwards to a lowermost angular position 210, corresponding to an angle $\theta_{Low}$ (208) and maintain operation of the illumination assembly 156 and the aiming assembly 152. The angles $\delta_{HIGH}$ and $\theta_{Low}$ set the bounds for an enable angular region of scanning, and may be set as threshold angles stored in the spatial orientation sensor 158. If the barcode reader 100 changes its angular position to be at an angle (i.e., relative to reference angular position 204 as measured by the spatial orientation sensor 158) to be greater than $\theta_{HIGH}$ or greater than $\theta_{Low}$ (measured as a positive angle below the reference position) then the barcode reader 100 is determined to be in a disable angular region and at least one of the illumination assembly 156 or the aiming assembly 152 is disabled and prevented from producing any light output into the field of view of the barcode reader 100.

In some examples, the threshold angles $\theta_{HIGH}$ and $\theta_{Low}$ are the same, while in other examples, including that shown in FIG. 2A, the two angles are different.

In some examples, the barcode reader 100 includes only one threshold angle, either a $\theta_{HIGH}$ or a $\theta_{Low}$.

The angles $\theta_{HIGH}$ and $\theta_{Low}$ are disable angles, whereby when the spatial orientation sensor 158 senses that the barcode reader orientation is above or below, respectively, either angle then the barcode reader 100 disables one or both of the assemblies 156 and 152.

In some examples, re-enabling the assemblies 156 and 152, after disabling, occurs when the barcode reader 100 is re-orientated to be at or less than disable angle $\theta_{HIGH}$ or at or less than disable angle $\theta_{Low}$. In such examples, the disable angle is the same as the enable angle, for orientation.

Figure 2B:
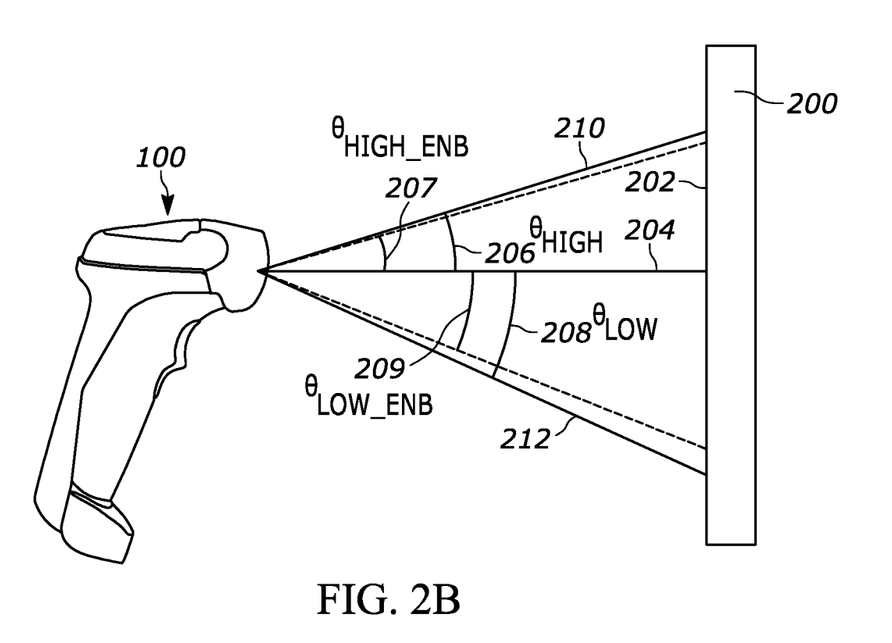

In other examples, however, re-engaging the assemblies 156 and 152, after disabling, occurs when the barcode reader 100 is re-orientated at a different angle. That is, the enable able is different than the disable angle, thus exhibiting hysteresis. This is shown in FIG. 2B. When the barcode reader 100 is oriented in a disable angular region above the disable angle $\theta_{HIGH}$, the barcode reader 100 does not enter the enable angular region until the barcode reader 100 is at an orientation corresponding to enable angle $\theta_{HIGH\_ENB}$ (207) or lower, where $\theta_{HIGH\_ENB}$ is less than $\theta_{HIGH}$. Similarly, when the barcode reader 100 is oriented in a disable angular region below the disable angle $\theta_{LOW}$ the barcode reader 100 does not enter the enable angular region until the barcode reader 100 is at an orientation corresponding to enable angle $\theta_{LOW\_ENB}$ (209) or lower, where $\theta_{low\_ENB}$ is less than $\theta_{HIGH}$, measured as positive angles only.

Figure 3:
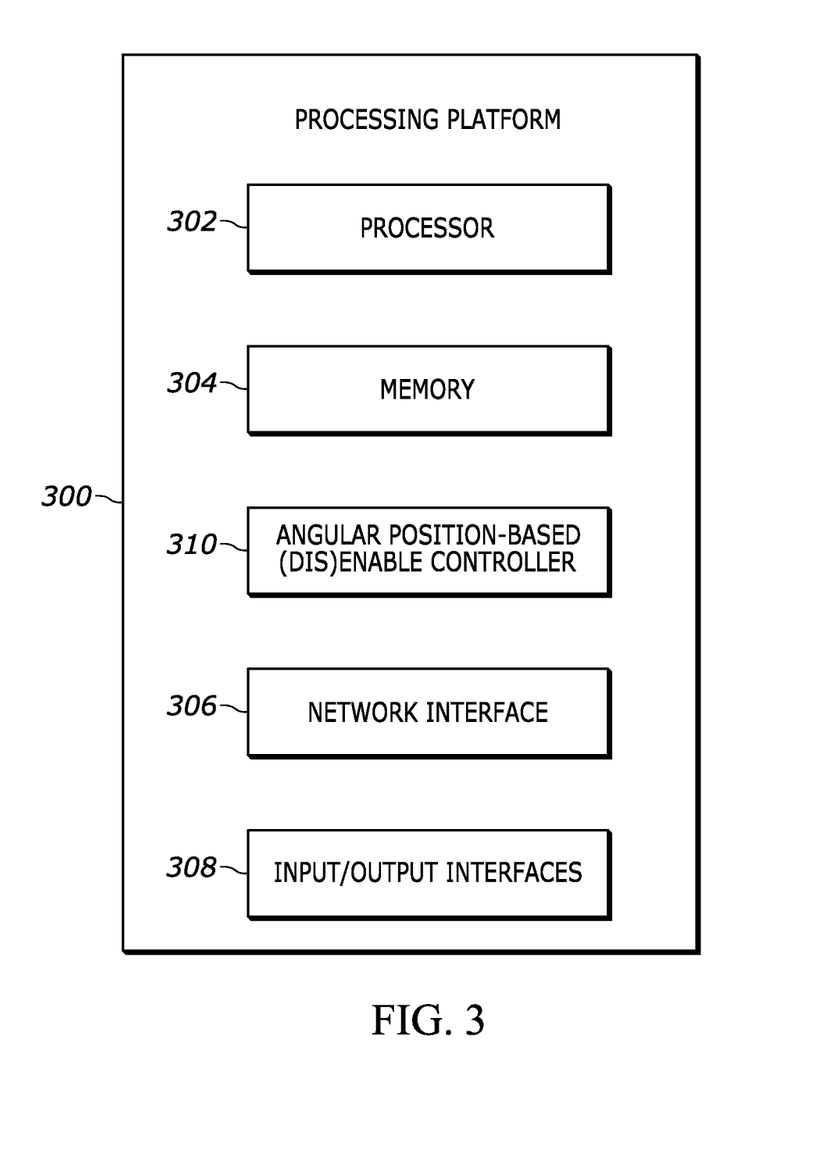
FIG. 3 is a block diagram of an example logic circuit in the form of a processing platform as may be in the barcode reader of FIG. 1 for implementing example methods and/or operations described herein.

FIG. 3 is a block diagram representative of an example logic circuit capable of implementing, for example, one or more components of the example barcode reader 100 of FIG. 1, 2A, 2B, 6A, 6B, 7A, or 7B or, more generally, the example processing platform 154 of FIG. 1. The example logic circuit of FIG. 3 is a processing platform 300 capable of executing instructions to, for example, implement operations of the example methods described herein, as may be represented by the flowcharts of the drawings that accompany this description, including those of FIGS. 4 and 5. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 306 to enable communication with other machines via, for example, one or more networks. The example network interface 306 includes any suitable type of communication interface(s) (e.g., wired and/or wireless interfaces) configured to operate in accordance with any suitable protocol(s).

The example processing platform 300 of FIG. 3 also includes input/output (I/O) interfaces 308 to enable receipt of user input and communication of output data to the user.

The processing platform 300 of FIG. 3 further includes an angular position-based (dis)enable controller 310, which may be configured to perform operations represented by the flowcharts and other processes of this disclosure as described herein, such as those described in reference to FIGS. 2A, 2B, 6A, 6B, 7A, and 7B. The angular position-based (dis)enable controller 310, for example, may be configured to receive spatial orientation data from a spatial orientation sensor, data such as the angular position of a barcode reader relative to a reference angular position, and then determine whether the barcode reader is in a disable angular region and, if so, disable at least one of an illumination system in the barcode reader to prevent the barcode reader from illuminating a field of view or an aiming system in the barcode reader to disable the barcode reader from transmitting an aiming visual indicator. In some examples, the spatial orientation sensor may be configured to determine if the barcode reader angular position is in the disable angular region or the enable angular region. In other examples, the spatial orientation sensor sends angular position data to the angular position-based (dis)enable controller 310, which determines if the barcode reader is in a disable angular region or an enable angular region.

By disabling the illumination assembly and/or the aiming assembly with the barcode reader at a disable angular region, the operator and other persons around the barcode reader are protected from unwanted and at times dangerous illumination being shown in their eyes. These assemblies are turned off and maintained off, based on the angular position of the barcode reader, thereby preventing intense light from entering a person's eyes directly or through reflections.

Figure 4:
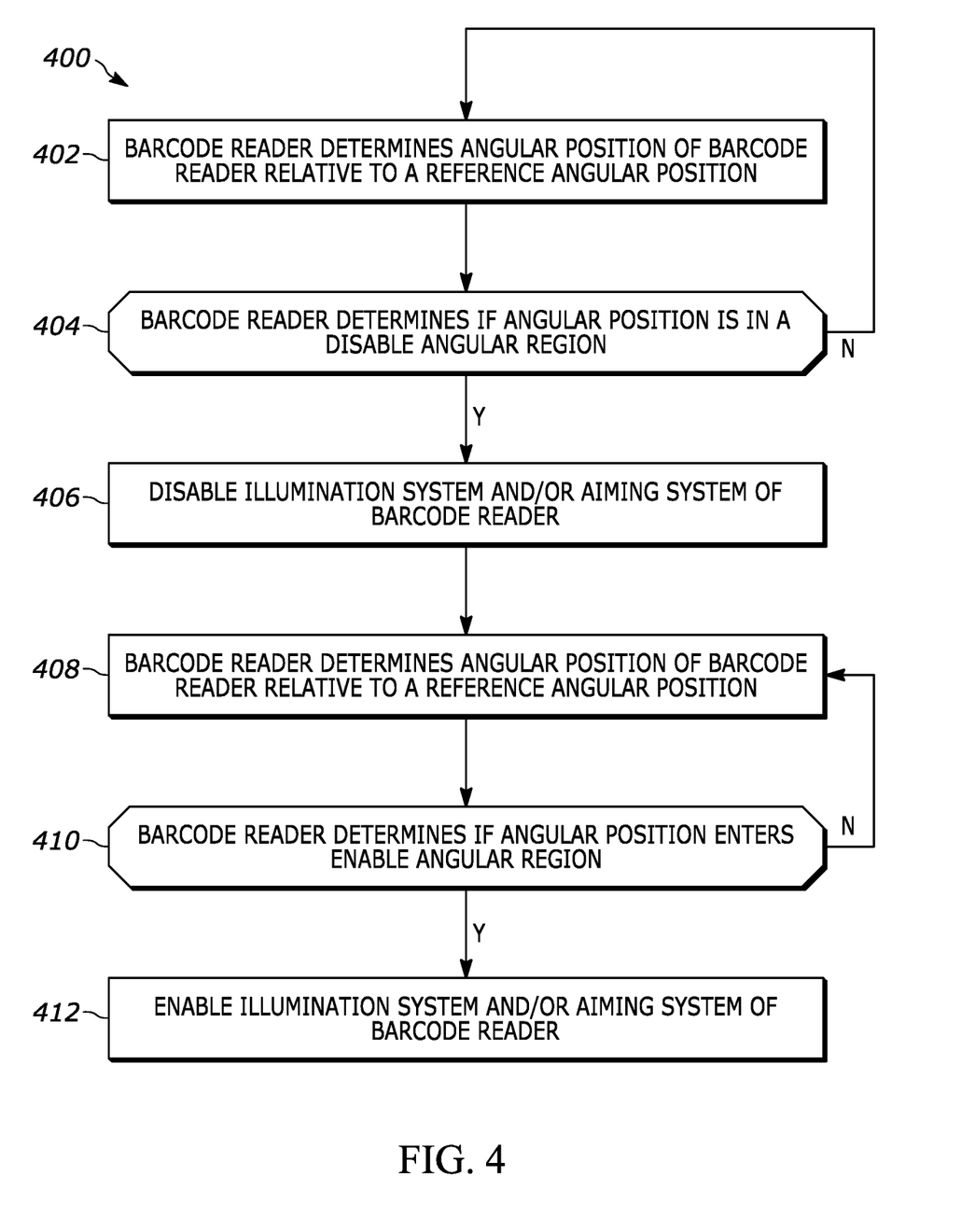
FIG. 4 is a process diagram of an example method as described herein.

FIG. 4 is an illustration an example process 400 of a method for controlling illumination of a barcode reader, as may be performed by the barcode reader 100 in FIGS. 1, 2A, and 2B, or any of the devices described in reference to the techniques, including those devices shown in FIGS. 5A, 5B, 6A, and 6B.

At a process 402, the angular position of the barcode reader is determined relative to a reference angular position. In some examples, the barcode reader determines the angular position relative to the reference angular position. For example, the barcode reader may include a spatial orientation sensor, such as the sensor 158 in the barcode reader 100. In some examples, the spatial orientation sensor includes an accelerometer to determine angular position. In some examples, the angular position of the barcode is determined by an external mechanism, such as a spatial orientation sensor external to the barcode reader. An example external spatial orientation sensor is an orientation sensor mounted in a platform structure onto which the barcode reader is mounted for scanning and/or for stowing.

The reference angular position may be stored in the barcode reader, such as in a spatial orientation sensor thereof or in the processing platform of the computing device.

At process 404, the barcode reader determines if its angular position data of the barcode reader is in a disable angular region. In an example, an angular position-based (dis)enable controller, such as the controller 310, accesses a spatial orientation sensor, such as sensor 158, to receive current angular position data, which the controller 310 then compares to one or more stored disable angles. If the controller 310 determines that the current angular position data is in a disable angular region, then the controller 310 selectively disables one or both of the illumination assembly and the aimer assembly, at process 406. The determination of disable angular region may be made by comparing the current angular position to a disable angle(s), such as $\theta_{HIGH}$ and $\theta_{LOW}$ in the example of FIGS. 2A and 2B.

The controller 310 may be configured to disable the illumination assembly, while maintain the aimer assembly as operational, or vice versa. In yet other examples, both are disabled at the process 406. In some examples, different disable angle(s) and enable angles(s) may be used for each of the different assemblies. That is, the process 400 may be modified to define a first disable angular region that is used to disable to the illumination assembly and a second disable angular region for the aimer assembly. Similarly, the process 400 may be modified to define a first enable angular region for the illumination assembly and a second enable angular region for the aimer assembly.

In some examples, the angular position-based (dis)enable controller 310 continually poles the spatial orientation sensor for angular position data. In some examples, the controller 310 periodically poles the spatial orientation sensor for angular position data, such as every 10 ms-100 ms.

In some examples, the angular position-based (dis)enable controller 310 poles the spatial orientation sensor in response to a trigger event, such as in response to receiving a signal from the spatial orientation sensor indicating that the barcode reader has moved; this is an example of a sensor initiated polling. In some examples, the angular position-based (dis)enable controller 310 poles the spatial orientation sensor in response to an externa trigger, such as when the barcode reader is mounted to a base or other platform having a sensor detecting the mounting of the barcode reader. In some examples, the triggering event is the detection of the barcode reader being placed into a certain scanning mode, such as a being mounted in a base and thereby placed into a presentation mode (or other hands-free mode), as sensed by a sensor in the base. In some examples, the controller 310 poles the spatial orientation sensor in response to the barcode reader being in handheld mode, which may be sensed by an accelerator in the barcode reader, by a sensor in a base, or by other techniques.

In some examples, the barcode reader may be configured to define different disable angular regions depending on the operating mode of the barcode reader. For example, the angular position-based (dis)enable controller 310 may be configured such that a first disable angle (or angles when considering HIGH and LOW angles from a reference angular position) is used at the process 404 when the barcode reader is a first mode, such as a presentation mode, and a second, different disable angle (or angles) is used at the process 404 when the barcode reader is a second mode, such as a handheld mode.

At the process 404, if the barcode reader determines the current angular position is not within a disable angular region, then control is passed back to process 402 for updating the angular position, e.g., if the barcode reader angular positioned is changed.

With the barcode reader in the disable angular, at a process 408 the barcode reader determines the current angular position relative to the reference angular position. That is, the process 408 may represent the continuous monitoring of the angular position that is being done by the spatial orientation sensor. At process 410, the angular position-based (dis)enable controller 310 determines if the barcode reader has entered an enable angular region. In the illustrated example, when the current angular position enters the enable angular region, at a process 412, the angular position-based (dis)enable controller 310 enables whichever of the illumination assembly or aimer assembly that has been disabled at process 406. The determination of enable angular region may be made by comparing the current angular position to an enable angle(s), such as $\theta_{HIGH\_ENB}$ and $\theta_{LOW\_ENB}$ in the example of FIG. 2B, where the enable angle(s) may be different than the disable angle(s). Further, the enable angle(s) may differ based on the operating mode of the barcode reader, e.g., presentation mode or handheld mode.

As described, the disable angles(s) and enable angles(s) may vary depending on the mode of operation of the barcode reader. In some examples, the barcode reader allows for adjust of the disable angle(s) and enable angle(s) and thus for adjusting the disable angular region and the enable angular region. These adjustments may be made by a user interfacing with an input device connected to the barcode reader. In some examples, the barcode reader includes an input device, such as a touchpad or keypad, for entering or adjusting the disable angle(s) and enable angle(s). The disable angle(s) and enable angle(s) may be stored in a memory, such as the memory 304 of the processing platform 300.

Figure 5A:
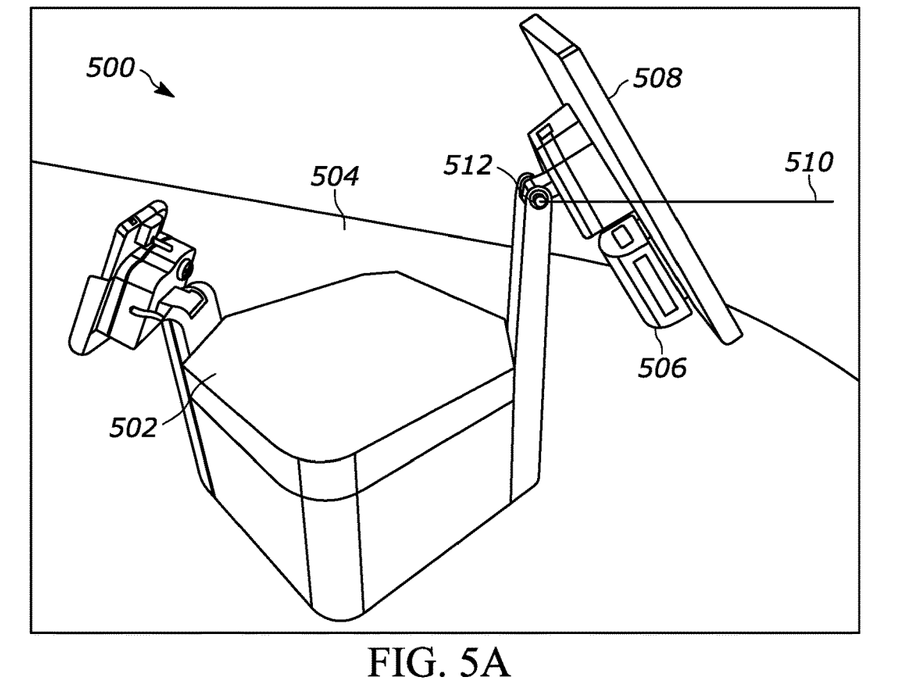
FIGS. 5A and 5B illustrate various example scanning positions, including an enabled scanning region and a disabled scanning region, respectively, of another example barcode reader demonstrating operations of methods and/or operations described herein.
Figure 5B:
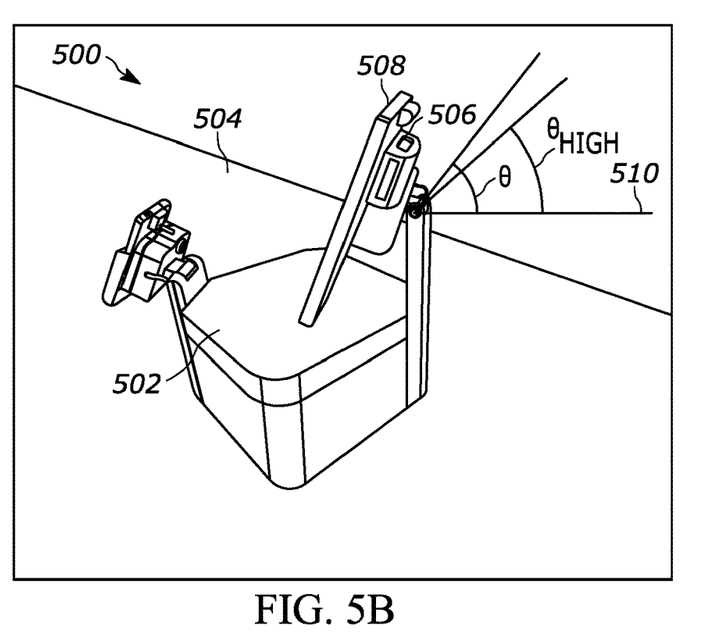

The present techniques may be used on any type of barcode readers. FIGS. 5A and 5B illustrate an example base-mounted barcode reader 500 formed with a base 502 positioned on a surface 504. The barcode reader 500 includes a barcode scanner assembly 506 that is affixedly mounted to a reader display interface 508. In an example, the barcode scanner assembly 506 includes an illumination assembly, an aiming assembly, an imaging assembly, and a spatial orientation sensor, similar to the corresponding elements of the barcode reader 100 in FIG. 1. Mounted in either that barcode scanner assembly 506, the displace interface 508, or the base 502 is a processing platform configured to control operation of these assemblies and sensor, for implementing operations of the example methods described herein. As shown in FIG. 5A, the barcode scanner assembly 506 is directed downward and in an enable angular region. In this example, the barcode reader 500 is configured such that any angular position below a horizontal reference angular position 510 is within an enable angular region. As shown in FIG. 5B, the barcode scanner assembly 506 is directed upward, at an angular position, θ, greater than a disable angle $θ_{HIGH}$, and thus in a disable angular region.

In the illustrated example, the barcode scanner assembly 506 is rotated by moving the display interface 508 about a pivot point 512 as shown, where that pivot point may allow for 360° rotational movement of the display interface 508 and thus the mounted assembly 506, in some examples.

In some examples, the spatial orientation sensor may be within the display interface 508. In other examples, the spatial orientation sensor may be within the base 502 and is configured to detect the angular position by sensing rotation about the pivot point 512.

In some examples, an operating mode sensor or trigger is formed as part of the display interface 508.

Figure 6A:
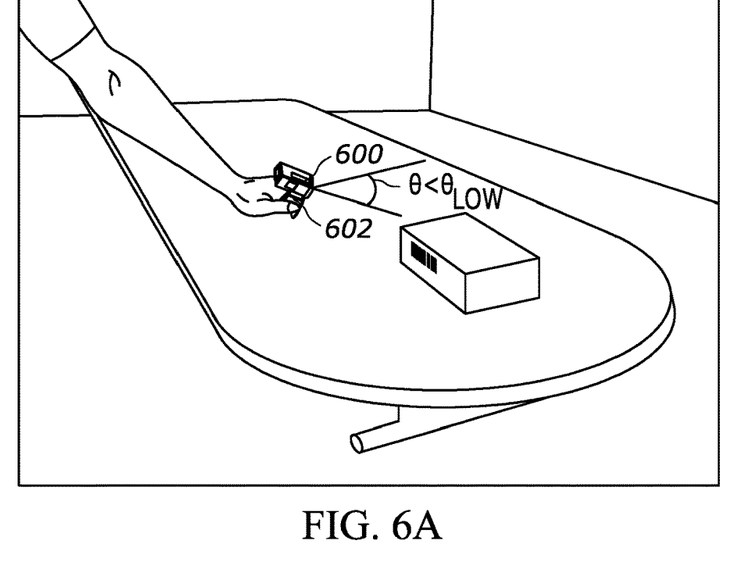
FIGS. 6A and 6B illustrate various example scanning positions, including an enabled scanning region and a disabled scanning region, respectively, of yet another example barcode reader demonstrating operations of methods and/or operations described herein.
Figure 6B:
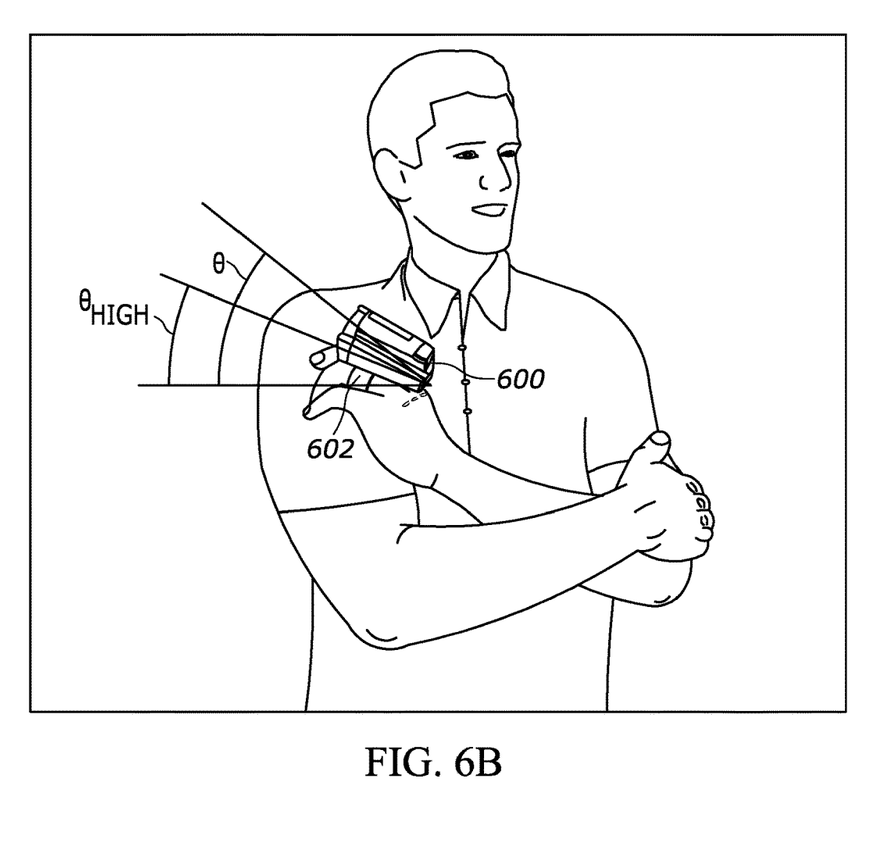

FIGS. 6A and 6B illustrate an example wearable barcode reader 600 attached to a wearable fastener 602, such as an adjustable armband, wristband, or finger mount. As with the example of FIG. 5A, the barcode reader 600 having the angular position in FIG. 6A is in an enable angular region. In FIG. 6B, however, the barcode scanner assembly 600 is directed upward, at an angular position, θ, greater than a disable angle $θ_{HIGH}$, and thus in a disable angular region.

In the examples of FIGS. 6A and 6B, the barcode reader 600 is a ring scanner with an internal spatial orientation sensor, such as an accelerometer. In some examples, a wearable barcode reader like this (or other portable barcode reader) may use other data to determine whether to disable or enable an illumination assembly and/or aimer assembly. For example, the barcode reader 600 may include a Bluetooth transceiver and use receipt of a Bluetooth signal from an external Bluetooth transmitter to determine a position of the barcode reader. In some such examples, that Bluetooth signal may be used by the barcode reader to determine angular position of the barcode reader, for example, by doing a signal analysis using a beamsteering or other means of the Bluetooth transceiver antenna within the barcode reader.

The techniques herein may be used in barcode scanning applications where precision placement of the barcode reader is important. Example applications include fixed position barcode reader kiosks, where the barcode reader is to be maintained in a fixed angular position at all times. The present techniques then can be used to determine when the barcode reader angular position has changed, disabling the illumination assembly as a result. Upon such a fault condition, which may occur when the kiosk is jostled, for example, or when the kiosk is taken under maintenance and maintenance personal do not properly re-align the scanner, the barcode reader may be configured to additional send an electric alarm signal indicating that it is in a disable angular region and that the illumination assembly is no longer enabled. Such a single may be generated by a processing platform and communicated to a remote display or remote processing device communicatively coupled to the barcode reader through a wireless or wired interface.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.)

on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for controlling illumination of barcode reader, the method comprising:
receiving, at the barcode reader, an angular position of the barcode reader, wherein the angular position is relative to a reference angular position of the barcode reader;
determining when the angular position of the barcode reader is in a disable angular region; and
in response to the angular position of the barcode reading being in the disable angular region, disabling at least one of an illumination system in the barcode reader to prevent the barcode reader from illuminating a field of view or an aiming system in the barcode reader to disable the barcode reader from transmitting an aiming visual indicator.

2. The method of claim 1, further comprising:
determining when the angular position of the barcode reader is in an enable angular region; and
in response to the angular position of the barcode reading being in the enable angular region, enabling at least one of the illumination system in the barcode reader to illuminate a field of view or the aiming system in the barcode reader to transmit the aiming visual indicator.

3. The method of claim 2, wherein determining when the angular position of the barcode reader is in the disable angular region comprises determining when the angular position of the barcode reader is greater than a disable angle; and wherein determining when the angular position of the barcode reader is in the enable angular region comprises determining when the angular position of the barcode reader is less than an enable angle.

4. The method of claim 3, wherein the disable angle and the enable angle are the same.

5. The method of claim 3, wherein the disable angle and the enable angle are different angles.

6. The method of claim 3, wherein in response to the angular position of the barcode reading being in the disable angular region, disabling both illumination system in the barcode reader to prevent the barcode reader from illuminating a field of view and the aiming system in the barcode reader to disable the barcode reader from transmitting an aiming visual indicator; and
wherein in response to the angular position of the barcode reading being in the enable angular region, enabling both the illumination system in the barcode reader to illuminate a field of view and the aiming system in the barcode reader to transmit the aiming visual indicator.

7. The method of claim 2, wherein determining when the angular position of the barcode reader is in the disable angular region or in the enable angular region comprises: determining, from an accelerator in the barcode reader, the angular position of the barcode reader.

8. The method of claim 2, wherein determining when the angular position of the barcode reader is in the disable angular region or in the enable angular region comprises: determining, from an accelerator in a base onto which the barcode reader is a mounted, the angular position of the barcode reader.

9. The method of claim 2, further comprising:
adjusting the disable angular region and/or the enable angular region; and
storing an adjusted disable angular region and/or an adjusted enable angular region in a memory of the barcode reader.

10. The method of claim 9, further comprising:
adjusting the disable angular region and/or the enable angular region, in response to the barcode reader switching between a presentation mode and handheld mode.

11. A barcode reader comprising:
an accelerometer configured to determine an angular position of the barcode reader relative to a reference position of the barcode reader;
a processor configured to:
receive the angular position of the barcode reader;
determine when the angular position of the barcode reader is in a disable angular region; and
in response to the angular position of the barcode reading being in the disable angular region, disable at least one of an illumination system in the barcode reader to prevent the barcode reader from illuminating a field of view or an aiming system in the barcode reader to disable the barcode reader from transmitting an aiming visual indicator.

12. The barcode reader of claim 11, wherein the processor is configured to:
determine when the angular position of the barcode reader is in an enable angular region; and
in response to the angular position of the barcode reading being in the enable angular region, enable at least one of the illumination system in the barcode reader to illuminate a field of view or the aiming system in the barcode reader to transmit the aiming visual indicator.

13. The barcode reader of claim 12, wherein the processor is configured to:
determine when the angular position of the barcode reader is in the disable angular region by determining when the angular position of the barcode reader is greater than a disable angle; and
wherein the processor is configured to determine when the angular position of the barcode reader is in the enable angular region by determining when the angular position of the barcode reader is less than an enable angle.

14. The barcode reader of claim 13, wherein the disable angle and the enable angle are the same.

15. The barcode reader of claim 13, wherein the disable angle and the enable angle are different angles.

16. The barcode reader of claim 13, wherein the processor is configured to, in response to the angular position of the barcode reading being in the disable angular region, disable both illumination system in the barcode reader to prevent the barcode reader from illuminating a field of view and the aiming system in the barcode reader to disable the barcode reader from transmitting an aiming visual indicator; and
wherein the processor is configured to, in response to the angular position of the barcode reading being in the enable angular region, enable both the illumination system in the barcode reader to illuminate a field of view and the aiming system in the barcode reader to transmit the aiming visual indicator.

17. The barcode reader of claim 12, wherein the processor is configured to:
adjust the disable angular region and/or the enable angular region; and
store an adjusted disable angular region and/or an adjusted enable angular region in a memory of the barcode reader.

18. The barcode reader of claim 17, wherein the processor is configured to:
adjust the disable angular region and/or the enable angular region, in response to the barcode reader switching between a presentation mode and a handheld mode.

19. The barcode reader of claim 11, wherein the barcode reader is a wearable barcode reader.

20. The barcode reader of claim 11, wherein the barcode reader is a handheld barcode reader.

21. The barcode reader of claim 11, wherein the barcode reader is a base-mounted barcode reader.

* * * * *